350-96.14

XR 3,944,820

United State

Stotts

[11] 3,944,820

[45] Mar. 16, 1976

[54] HIGH SPEED OPTICAL MATRIX MULTIPLIER SYSTEM

[75] Inventor: Larry B. Stotts, Chula Vista, Calif.

[73] Assignee: The United States of America as represented by the Secretary of the Navy, Washington, D.C.

[22] Filed: May 12, 1975

[21] Appl. No.: 576,773

[52] U.S. Cl. ................ 250/227; 250/225; 250/578; 350/159; 350/160 R; 350/96 WG

[51] Int. Cl.² ........................ G02F 1/01; G02B 5/17

[58] Field of Search ........... 250/227, 225, 578, 208, 250/209, 216, 229; 350/96 R, 96 WG, 159, 160 R; 235/181, 194

[56] References Cited

UNITED STATES PATENTS

| | | | |
|---|---|---|---|
| 3,484,151 | 12/1969 | Turner | 350/159 X |
| 3,517,200 | 6/1970 | Kalman | 350/96 WG X |
| 3,633,993 | 1/1972 | Goldberg | 350/159 X |
| 3,691,484 | 9/1972 | Dore | 350/160 R X |
| 3,766,498 | 10/1973 | Brewer | 350/160 R X |

*Primary Examiner*—Archie R. Borchelt
*Assistant Examiner*—E. R. LaRoche
*Attorney, Agent, or Firm*—R. S. Sciascia; G. J. Rubens; J. W. McLaren

[57] ABSTRACT

Matrix-vector multiplication is accomplished by continuous wave polarized light energy transmitted along a plurality of optical waveguides through modulation by a first optical modulator in response to a column vector type input signal and additional modulation by a second optical modulator in response to a row vector type input signal. The resultant modulated light energy outputs are received by a polarization analyzer for transforming modulations in polarization and phase to commensurate amplitude modulations. A photo-responsive storage and integrating means receives the light energy associated with each of the optical waveguides and develops a cumulative signal representative of the matrix-vector multiplication.

6 Claims, 4 Drawing Figures

3944820
OR IN 250/227

HIGH SPEED OPTICAL MATRIX MULTIPLIER SYSTEM

BACKGROUND OF THE INVENTION

In many systems involving signal analysis and signal correlation, for example, it is often necessary or desirable to perform the mathematical procedures of matrix multiplication. The step-by-step mental calculation of even the simplest and most rudimentary type of matrix multiplication, however, can be an extremely time consuming and laborious procedure in addition to being subject to human error.

Accordingly, systems have been proposed for automatically performing matrix multiplication of various types by other than the step-by-step mental calculations. Many such known systems for performing matrix multiplication are exclusively or extensively electronic in nature. Moreover, such systems are generally comparatively expensive, often bulky in size, and in many instances limited as to the types of input signals which may be processed as well as being limited in the processing speeds which may be realized in their operation.

Additionally, a number of optical processor systems have been proposed to perform matrix multiplication functions employing both coherent and incoherent light in their operation. Several of such optical systems for performing matrix multiplication processors have, however, suffered from problems of large size, high cost, limited speeds of operation, mechanical instability, and difficulty of maintaining optical alignment. Such inherent problems have impeded the realization of the full potential of automatic matrix multiplication systems.

Accordingly, there is a need for a matrix multiplication system which will complete its procedures in real time, at very high speeds employing optical technology, and which is simple, more compact, less expensive, and, in general, free from problems associated with prior art matrix multiplication systems intended to provide functionally comparable results.

SUMMARY OF THE INVENTION

The high speed optical matrix multiplier system of the present invention is conceived to perform matrix multiplication of the form $$((A_{M,N}))\ B_{N,l} = C_{M,l} \quad (1)$$

where $A_{M,N}$ ≡ $M \times N$, representative of a linear matrix operator $B_{N,l}$ ≡ $N \times l$, representative of a column vector input $C_{M,l}$ ≡ $M \times 1$, representative of a column vector processed output Examples of the linear matrix operator $((A_{M,N}))$ are mathematical transformations (such as the Walsh-Hadamard and Fourier transforms), filtering functions and combinations of these transforms and functions.

The present invention contemplates the use of a plurality of linear arrays for performing row column vector multiplication through the use of optical waveguides, optical modulators, a polarization analyzer, and a plurality of integrating storage detectors. In each of the linear arrays the time modulated signal derived from one of the typical sources, such as those listed hereinbefore, is employed to temporally, optically modulate continuous waveguide, for example.

The light energy is modulated by a first modulator responsive to a column vector type input signal, for example, and then undergoes a second modulation by an appropriate second optical modulating means which is responsive to a row vector type input signal for temporally modulating the light energy transmitted along the optical waveguide.

The resultant twice-modulated light energy is received by a polarization analyzer which performs the function of converting such modulations in polarization and phase of the light energy to commensurate intensity modulations.

The output of the polarization analyzer is received by an appropriate photo-responsive detector which cumulatively stores the received modulated light energy over a time period synchronous with the time periods of the column vector type input signal and the row vector type input signals.

The number of such linear arrays is dependent upon the value of a M for each matrix multiplier system as it appears in the generalized example of the form of matrix-vector multiplication given in the foregoing equation (1).

The concept of the present invention inherently contemplates that light energy sources, optical waveguides, optical modulators, and photo-responsive detectors can be immediately adjacent to each other in fixed position so that the system is virtually insensitive to shock and vibration and, moreover, does not suffer from optical alignment problems.

Additionally, in accordance with the concept of the present invention, high processing speed in the MHz to GHz range are readily attainable and limited only by the operative rate of the optical modulators and photo-responsive detectors which are employed. Using integrated optic technology within the present state of the art, linear arrays forming the system of the present invention may be fabricated on a single unitary substrate thereby lowering cost and size, as well as further insuring vibration insensitivity and obviating optical alignment problems.

Those skilled and knowledgeable in the pertinent arts will also appreciate the highly advantageous aspect of the concept and teaching of the present invention by reason of which it can perform both analog processing and digital processing in that the rows of the matrix may be continuous functions as well as the input signal.

Accordingly, it is a primary object of the present invention to provide an improved high speed, optical matrix multiplier system for performing matrix vector multiplication without the attendant disadvantages of known comparably functional systems.

Another most important object of the present invention is to provide such a matrix-multiplier system capable of processing speeds in the MHz and GHz range which is limited only by the operative rates of the optical modulators and photo-responsive detectors employed in its fabrication.

A further object of the present invention is to provide such a matrix multiplier system which is readily adaptable to employing integrated optic technology for fabrication on a unitary substrate.

A concomitant object of the present invention is to provide such a matrix multiplier system which is significantly lower in cost and size.

Yet a further object of the present invention is to provide such a matrix multiplier system which, by reason of its adaptability to desirable integrated optic technology, is substantially insensitive to vibration and inherently obviates optical alignment problems.

A further object of the present invention is to provide an optical matrix multiplier system which is inherently capable of performing both analog and digital processing.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

The high speed optical matrix multiplier of the present invention is a system for performing matrix multiplication of the form $$((A_{M,N}))\ B_{N,l} = C_{M,l}$$

where $A_{M,N}$ ≡ M × N, representative of a linear matrix operator $B_{N,l}$ ≡ N × l, representative of a column vector input $C_{M,l}$ ≡ M × l, representative of a column vector processed output Typical examples of the linear matrix operator ($A_{M,N}$) are mathematical transformations which may include a Walsh-Hadamard or Fourier transforms, for example, filtering functions, and/or combinations of these functions and transformations. A typical input signal may be generated from radar returns, brain wave activity, cardiovascular activity, or acoustical signals, for example.

The optical matrix multiplier system contemplated by the concept of the present invention comprises a plurality of linear arrays each of which may be considered as a smaller subsystem for performing row-column multiplication. Each such subsystem or linear array includes optical waveguides, optical modulators, and photo responsive integrating storage detectors, as well as a polarization analyzer. For purposes of clarity of explanation, the concept of the present invention will be explained initially in terms of one of the linear arrays which forms a subsystem within the total system concept.

Figure 1:
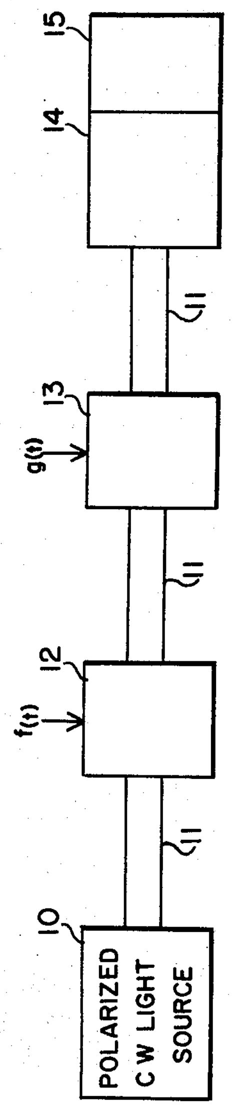
FIG. 1 is a schematic representation of a subsystem portion of the present invention.

Such a linear array or subsystem is represented schematically in FIG. 1. The subsystem combination illustrated schematically in FIG. 1 includes a polarized CW light source 10 such as may be generated by an appropriate laser assembly. The polarized CW light energy is transmitted along an optical path defined by an optical waveguide 11. A first optical modulator 12 operates to temporally modulate light energy traversing the waveguide 11 in response to an electrical function $f(t)$ derived from one of the typical sources such as the examples previously given. The light energy thus modulated then continues to be transmitted along waveguide 11 to a second optical modulator 13 where it is further operated upon and modulated in response to another signal having the function generally defined as $g(t)$.

In the illustrative example schematically represented by FIG. 1, the duration of both the signals $f(t)$ and $g(t)$ are chosen to be the same for purposes of clarity in explanation so that the first component $f(t)$ to reach the second optical modulator 13 arrives at the same instant the first component of the function $g(t)$ is operating to impress its modulation on the signal traversing the waveguide at the point of the second modulator. Thus each component of $f(t)$ that traverses the second modulator 13 is multiplied by its time counterpart in the function $g(t)$.

The resultant twice modulated output light energy is transmitted further down the waveguide 11 to a polarization analyzer 14 which converts modulations in polarization and phase to commensurate modulation of intensity of the light energy transmitted by the waveguide 11 after undergoing the two successive modulations as described. The intensity modulated light energy output of the polarization analyzer 14 is received by a photo-responsive detector 15 which is operative to cumulatively store the modulated light energy it receives over a time period which is synchronous with the time period of the two modulation functions $f(t)$ and $g(t)$.

The operation of the subsystem schematically illustrated in FIG. 1 may be explained in mathematical terms for illustrative purposes. If it is assumed that $f(t)$ represents a column vector type of signal, its composition may be designated by the three elements $b_{11}$, $b_{21}$, $b_{31}$ $$f(t) = (B_{3,1}) \begin{pmatrix} b_{11} \\ b_{21} \\ b_{31} \end{pmatrix} \tag{2}$$

In actual practice equation (2) could be representative of polarized CW light source modulation expressed as $b_{11}$ for the first third of a given period $\tau$, $b_{21}$ for the second third of the given period, and $b_{31}$ for the last third of the time period.

The mathematical expression $g(t)$ represents a row vector type of signal consisting of the elements $a_{j1}$, $a_{j2}$ and $a_{j3}$ so that $$g(t) = (A_{j,3})\ (a_{j1}, a_{j2}, a_{j3}) \tag{3}$$

The modulation of the light energy traversing the optical waveguide 11 would therefore be represented by $a_{j1}$ for the first third of $\tau$, by $a_{j2}$ for the second third of the time period, and, by $a_{j3}$ for the last third of the time period.

If both the modulating signals $f(t)$ and $g(t)$ are started at time $t = 0$, it can be seen that $b_{11}$ is transmitted along the optical waveguide and traverses the first optical modulator 12. Such modulation multiplies the light energy operated upon by $a_{j1}$ for the interval $0 \geq t, \geq \tau/3$ The resulting modulated output light energy $a_{j1}\ b_{11}$ then is transmitted further along the optical waveguides to the polarization analyzer where modulation in phase and polarization is translated to modulation of light intensity. The latter intensity modulated light energy is then received by the photo-responsive detector 15 where its magnitude is recorded and stored.

During the interval $$\frac{\gamma}{3} \geq t \geq \frac{2\gamma}{3},$$

$b_{21}$ replaces $b_{11}$ in the optical waveguide and $a_{j2}$ replaces $a_{j1}$. Therefore the product $a_{j2}\,b_{21}$ is the resultant modulated output which finally reaches the detector 15 and is added to the previous input $a_{j1}\,b_{21}$. Similarly, for $$\frac{2\gamma}{3} \geq t \geq t,$$

$b_{31}$ is multiplied by $a_{j3}$ and added to $a_{j1}\,b_{11}$ and $a_{j2}\,b_{21}$.

Thus, at the end of the period $\tau$, the cumulative quantity $a_{j1}\,b_{11} + a_{j2}\,b_{21} + a_{j3}\,b_{31}$ is received and stored in the photo responsive detector 15. By mathematical analogy the foregoing operations have performed the equivalent of the vector calculation $$(a_{j1}, a_{j2}, a_{j3}), \begin{pmatrix} b_{11} \\ b_{21} \\ b_{31} \end{pmatrix} = (a_{j1}b_{11} + a_{j2}b_{21} + a_{j3}b_{31}) \qquad (4)$$

Although only 3 bit codes were used in the foregoing illustrative example for purposes of clarity and simplicity of explanation, theoretically the number of elements in the two vectors, i.e., the column type vector signal and the row type vector input signal, could be infinite. As a practical matter, however, the number of bits which it is possible to handle is constrained by the limiting speeds of both the optical modulators and the photo-responsive detection units employed.

As a practical example, several commercially available electrooptical modulators operate in a range from 0 to exceeding 250 MHz and state-of-the-art charge storage devices responsive to photo energy can readily accommodate signals within the same range. Therefore, input signals modulated at such frequency ranges may be employed in the subsystem previously described. In general the foregoing described subsystem can readily accommodate signals of the form $$(A_{j,n}) = (a_{j1}, a_{j2}, \ldots, a_{jn}) \qquad (5)$$

$$(B_{n,l}) = \begin{pmatrix} b_{11} \\ b_{21} \\ \vdots \\ b_{n,l} \end{pmatrix} \qquad (6)$$

the total number of elements in the input signal and matrix row n is dictated by the speed of the optical modulator and the minimum required integration time of the detection system used.

Figure 2:
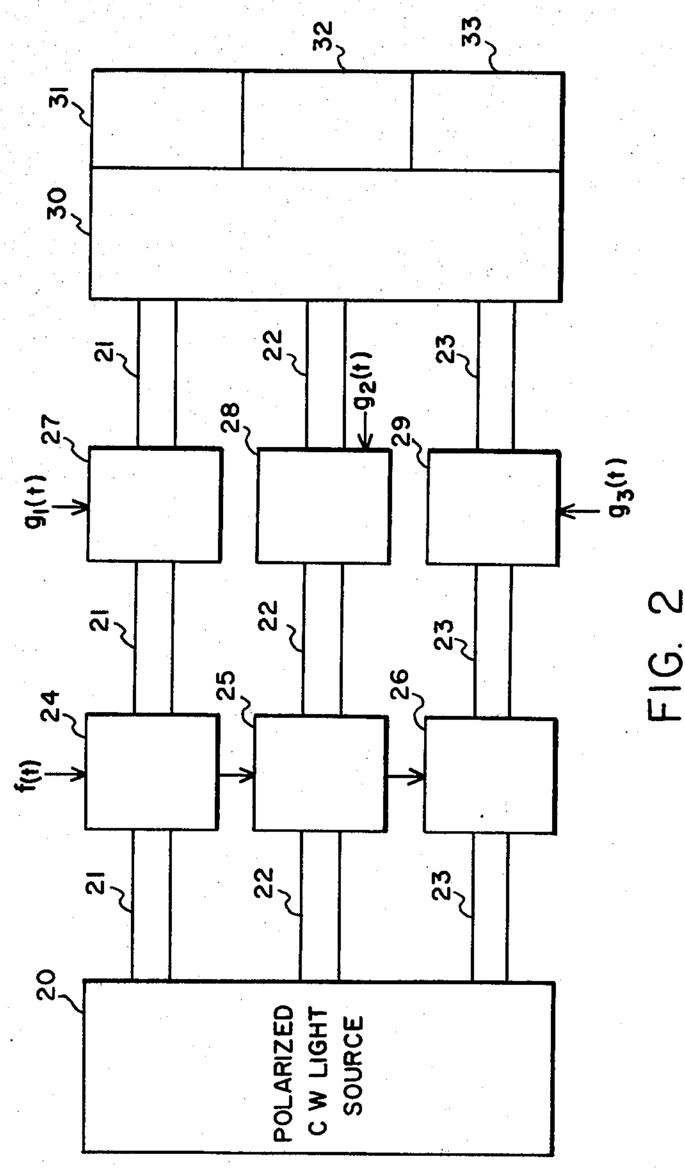
FIG. 2 is a schematic representation of one embodiment of the present invention.

The concept of the present invention contemplates the use of M number of the described subsystems in a linear array such as that illustrated in FIG. 2 so that it is possible to multiply the input signal $(B_{n,l})$ by several (A)/s simultaneously, in M row vectors so that each modulated result is stored in its respective associated photo-responsive detector in a cumulative form ready for readout or such further use as the resultant signal may contemplate. This latter, more complex operation, would in effect perform the matrix multiplication $$(A_{m,n})\,(B_{n,l}) = (C_{m,l}) \qquad (7)$$

wherein each of the $(A_{j,n})$s represents a row in the larger matrix $(A_{m,n})$ and the signals stored in the linear detector array are the components of the vector type signal $(C_{m,l})$.

In the system illustrated in FIG. 2 the polarized CW source 20 generates light energy which is transmitted along the optical path defined by optical waveguides 21, 22, and 23. The light energy propagating along these three optical paths is operated upon by optical modulator means 24, 25, and 26 which are responsive to a column vector type signal represented as $f(t)$.

The light energy thus modulated in the three optical waveguides 21, 22, and 23 is transmitted further along the respective optical paths to second modulating means 27, 28, and 29. The optical energy traversing the optical waveguide 21 is further modulated by a signal $g_1(t)$, the optical energy traversing the optical waveguide 22 is further modulated by a signal representative $g_2(t)$, and the optical energy traversing the optical waveguide 23 is further modulated by a signal represented generally as $g_3(t)$.

The respectively modulated light energy is further transmitted by the three optical waveguides 21, 22, and 23 to a polarization analyzer 30 which converts modulations in polarization and phase of light energy to commensurate intensity modulations for each of the three optical waveguides.

The intensity modulator light energy output associated with each optical waveguide is received by separate photo-responsive detector means 31, 32, and 33 where it is cumulatively stored over a time period which is synchronous with the time periods of the column vector type input signal $f(t)$ and the row vector type input signals $g_1(t)$, $g_2(t)$, and $g_3(t)$.

Figure 3A:
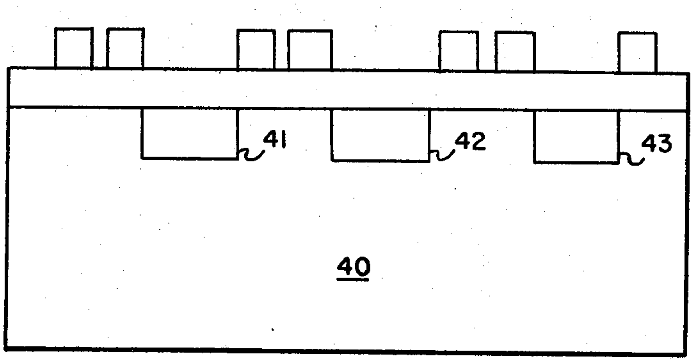
FIGS. 3*a* and 3*b* are illustrations of electro-optical modulators which may be used in the present invention.

The present invention may preferably be embodied in a unitary integrated optical substrate wherein electro-optical modulators are employed together with optical waveguides defined by selected material diffused into the substrate. Such an arrangement is illustrated in FIG. 3*a* and 3*b* which show a top view and end view, respectively, of one type of integrated optical circuitry fabricated to embody the concept and teaching of the present invention.

In the illustration of FIG. 3, a selected substrate such as cadmium sulphide is diffused with selenium through the open portions of a silicon oxide diffusion mask in accordance with established and known fabrication techniques. Thus, three optical waveguides 41, 42, and 43 are formed in the substrate to define optical paths for the transmission of light energy.

The surface of the substrate which is thus partially diffused is then covered with a full layer of silicon dioxide which provides an electrically insulating means and an appropriate conductor electrode pattern is deposited thereover. These techniques have been discussed and disclosed in the scientific literature as exemplified by publications of William E. Martin in the Journal of Applied Physics, Volume 44, No. 8, of August 1973 at pages 3703 through 3707 and William N. Caton in the Journal of Applied Physics, Volume 46, No. 1, of January 1970 at pages 260 through 265.

Figure 3B:
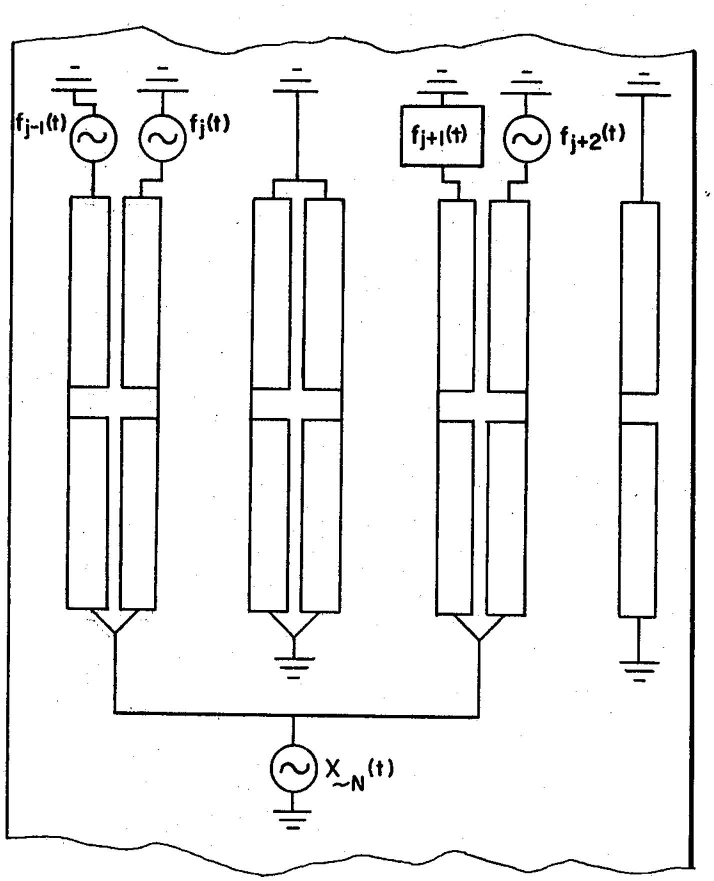
Figure 4:
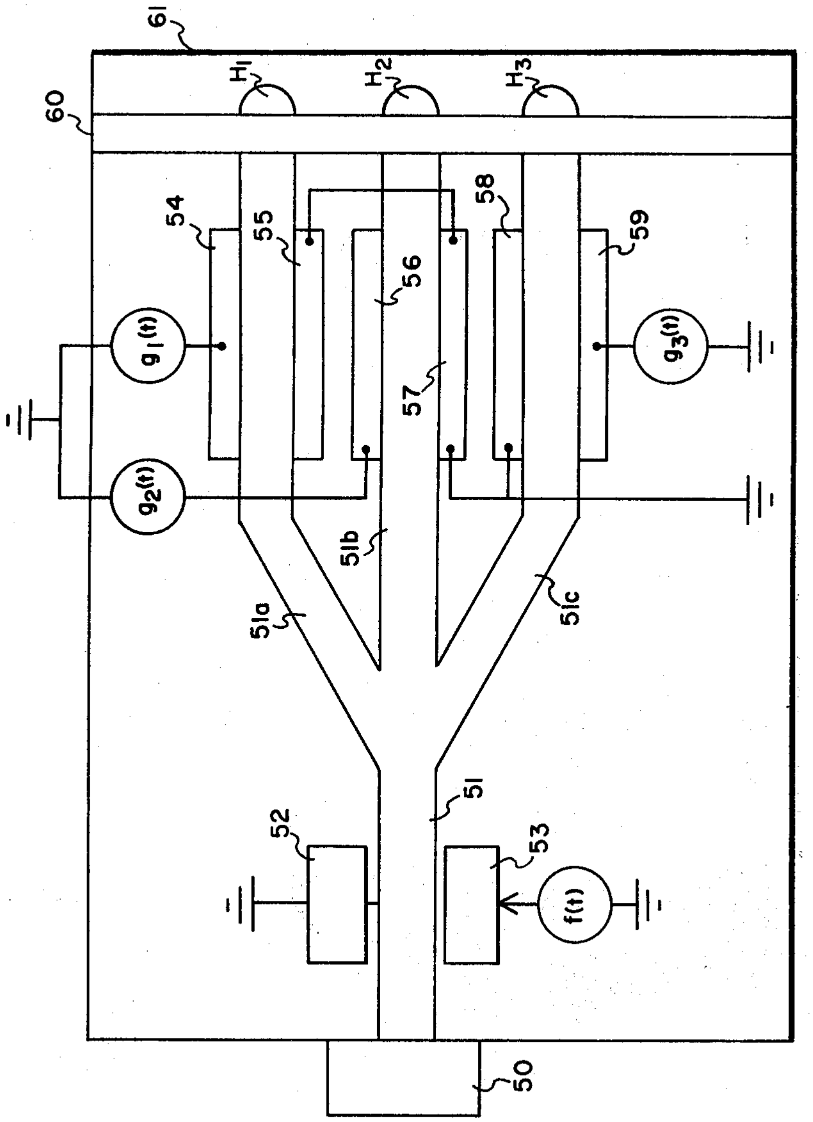
FIG. 4 is an illustration of a preferred embodiment of the present invention.

When electrical signals representative of a column vector type signal $f(t)$ and a row vector type signal $g(t)$ are impressed upon the electrodes as illustrated in FIG. 3*b*, modulation within the optical waveguide 41, 42 and 43 is given affect in accordance with the concept and teaching of the present invention. FIG. 4 illustrates the preferred embodiment of the present invention as fabricated employing desirable aspects of integrated optic techniques.

In the embodiment of FIG. 4, the source of polarized CW light energy preferably takes the form of a semiconductor junction laser. Its light energy is transmitted along a single optical waveguide 51 wherein all the light energy traversing the single path is modulated by an electro-optical modulating means which functions in response to the indicated signal $f(t)$ being impressed upon the aluminum electrodes 52 and 53.

The optical waveguide 51 then branches into three separate optical waveguides 51*a*, 51*b*, 51*c*, comprised of selenium diffused into the substrate cadmium sulphide defining three separate optical paths. The first optical waveguide 51*a* is acted upon by the indicated signals being impressed upon its associated electrodes 54 and 55. The second optical waveguide 51*b* is acted upon and modulated by the indicated signals being impressed upon the electrodes 55, and 56, while the third optical waveguide 51*c* is modulated by the indicated signals being impressed upon the electrodes 58, and 59.

The three respective light energy signals thus modulated are received by a polarization analyzer 60 which, as is known to those skilled and knowledgeable in the pertinent arts, operates and functions essentially in the manner of a polarization filter, converting modulation in phase and polarization to commensurate modulations of light intensity.

The text entitled *Polarized Light* by W. A. Shurcliff and S. S. Ballard, published by the D. Van Nostrand Co., Inc. includes theoretical and practical explanations of functions and operations of such polarization analyzers. Such intensity modulated light energy signals (corresponding to the modulation impressed upon the three waveguides, 51*a*, 51*b*, and 51*c* as previously described) are then received by an appropriate photoresponsive detector and storage device which may advantageously take the form of a charge coupled device array 61.

In the embodiment illustrated by FIG. 4 the legends employed are

A. Input Signal, $$f(t) = B_{n,l}$$
$$\equiv \text{N-bit long signal}$$

B. Resulting output $$\begin{pmatrix} H_1 \\ H_2 \\ H_3 \end{pmatrix} = C_{M,1}$$

C. Linear Operator $$\begin{matrix} g_1(t) \\ g_2(t) \\ g_3(t) \end{matrix} \equiv A_{M,N}$$

where $g_j(t)$ rows of the operator A
= N-bit long signal
for $j = 1, 2, 3$.

From the foregoing description it may be appreciated that the resulting signals stored in each detector represents the respective element of the output vector $C_{ml}$.

Within the concept and teaching of the present invention it will be appreciated that in addition to the optical waveguide modulator type of system described and illustrated embodiments the basic concept of the present invention contemplate the use of any equivalent optical modulation including fiber optic waveguidebulk modulator techniques or optical waveguides with internal modulators, for example. Additionally, light emitting diodes and/or junction lasers could be employed as the equivalent of the more conventional laser light source providing a polarized CW light energy source. Also, polarized modulating light sources could replace the CW source and the first modulator in the subsystems previously described.

Additionally, a spinning disc, with coded information disposed radially so that the disc is subdivided into rings containing the processing codes, may be employed to replace electro-optical modulators previously described in embodiments of the present invention. In the use of such a rotating coded disc each concentric ring on the disc would be associated with a particular waveguide to modulate the light energy transmitted by each waveguide in accordance with the coded modulation of each such associated concentric ring.

Moreover, in accordance with the concept of the present invention it is readily possible to use a acousto optical modulators in connection with giving affect to the desired modulation of the light energy waveguide in accordance with column vector type input signals and row vector type input signals.

Additionally, it will be appreciated by those skilled and knowledgeable in the pertinent arts that the polarization analyzer may be replaced with a functionally equivalent substitute such as a branch switch, polarization-cutoff optical waveguide, or resonant optical switch for example.

Further, any appropriate integrating-storage detecting array could be employed in place of the currently preferred charge coupled device array.

Alternative electro-optical waveguide structures which readily lend themselves to fabrication in accordance with the preferred techniques adaptable to use in practice of the present invention include waveguide structures in lithium niobate, lithium tantalate, gallium aluminum arsenide and other semiconducting materials exhibiting the desired properties in accordance with the concept and teaching of the present invention.

Obviously many modifications and variations of the present invention are possible in the light of the above teachings. It is therefore to be understood that within the scope of the appended claims the invention may be practiced otherwise than as specifically described.

What is claimed is:

1. A high-speed optical matrix multiplier system for performing matrix-vector multiplication of the form $$((A_{M,N}))\, B_{N,l} = C_{M,l}$$

where $A_{M,N} \equiv M \times N$, representative of a linear matrix operator $B_{N,l} \equiv N \times l$, representative of a column vector input $C_{M,l} \equiv M \times l$, representative of a column vector processed output comprising:

$M$ number of optical waveguides for transmitting continuous wave, polarized light energy;

a source of continuous wave, polarized light energy arranged to transmit its output along the optical paths defined by said optical waveguides;

first optical modulating means coupled to said optical waveguides and responsive to a column vector type input signal for temporally modulating the light energy transmitted;

second optical modulating means coupled to said optical waveguides and responsive to a row vector type input signal for temporally modulating the light energy transmitted by said optical waveguides, a polarization analyzer for converting the resultant modulations in polarization and phase of light energy to commensurate intensity modulations for each optical waveguide; and a photo-responsive detector disposed to receive and cumulatively store the modulated light energy output of each optical waveguide over a time period synchronous with the time periods of said column vector type input signal and said row vector type input signal.

2. A high speed optical matrix multiplier system as claimed in claim 1 wherein said first and second optical modulating means are electro-optical modulators.

3. A high speed optical matrix multiplier system as claimed in claim 1 wherein said first and second optical modulating means are acousto-optical modulators.

4. A high speed optical matrix multiplier system as claimed in claim 1 wherein said source of continuous wave, polarized light energy comprises light emitting diodes.

5. A high speed optical matrix multiplier system as claimed in claim 1 wherein said source of continuous wave polarized light energy is a laser.

6. A high speed optical matrix multiplier system as claimed in claim 1 wherein said source of continuous wave, polarized light energy comprises junction lasers.

* * * * *